United States Patent [19]

Löf

[11] 4,154,223
[45] * May 15, 1979

[54] MODULAR CONSTRUCTION FOR SOLAR HEAT COLLECTOR

[76] Inventor: George O. G. Löf, 6 Parkway Dr., Englewood, Colo. 80110

[*] Notice: The portion of the term of this patent subsequent to Feb. 14, 1995, has been disclaimed.

[21] Appl. No.: 875,329

[22] Filed: Feb. 6, 1978

Related U.S. Application Data

[63] Continuation of Ser. No. 553,471, Feb. 27, 1975, Pat. No. 4,073,283.

[51] Int. Cl.² ................................................. F24J 3/02
[52] U.S. Cl. ..................................... 126/270; 237/1 A
[58] Field of Search .............. 126/270, 271; 237/1 A; 165/143; 220/232, 111, 15; 312/111

[56] References Cited

U.S. PATENT DOCUMENTS

| | | | |
|---|---|---|---|
| 3,996,918 | 12/1976 | Quick | 126/270 |
| 4,073,283 | 2/1978 | Lof | 126/270 |

Primary Examiner—Albert W. Davis, Jr.
Assistant Examiner—James C. Yeung
Attorney, Agent, or Firm—Richard D. Law

[57] ABSTRACT

An open top housing member, the top being arranged to be closed by a solar radiation transparent covering, is arranged to be mounted in side by side and end to end relationship with similar members to provide a large area solar heat absorber unit, and each housing member includes passageways for the flow of fluids, such as air, and means for joining the members at the passageways, thereby providing an inlet fluid manifold at one edge of the combined housings and an outlet fluid manifold at the opposite edge of the housings providing the transfer of heat absorbed by the unit to the transfer fluid. Generally, the housing members are made of lightweight sheet metal and may be secured together either by crimping edges and flanges of adjoining members or lateral mechanical pressure at the passageways, and each is provided with an adjustable gate member for varying the flow pattern of the fluid through each individual member.

4 Claims, 10 Drawing Figures

MODULAR CONSTRUCTION FOR SOLAR HEAT COLLECTOR

This application is a continuation of my pending application Ser. No. 553,471 filed 2/27/75, now U.S. Pat. No. 4,073,283, issued Feb. 14, 1978.

This invention relates to modular construction for the heat collectors of a solar heating system, particularly to solar heating systems using air as the heat transfer medium.

Commonly known, solar heating systems utilize a large area heat collector for absorbing the heat from solar radiation for transfer to a transfer medium, whether it is water or other liquids, or air or gas. In such systems, a large surface area heat absorber is necessary for effective absorption of sufficient solar radiation. A cool transfer fluid is passed from one edge of the heat absorber surface to the opposite edge to heat the transfer fluid.

The heated transfer fluid is then passed to a storage system or for use. Where air is used as a transfer medium, a dull black surface has heretofore been exposed to the sun, under a transparent (at least to the major portions of solar radiation) cover. In some cases, the heat absorbing surface is spaced from an underlying insulation medium, and air is blown between the surface and the insulation medium, or in other cases, the air may be blown over and/or under the heat absorption surface. In the usual installation, the heat absorbing assembly is mounted on the roof of a structure, such as a house, building or the like, and is mounted at a slope, so as to provide as large an absorption area as possible, and preferably normal to the angle of solar radiation. As a mechanism to maintain the surface at exactly right angles to the solar radiation during all day and at all seasons is extremely expensive, such units are normally mounted at a slope which is a compromise between the high and low points of the sun at mid-day of the various seasons. Where air is the transfer medium, a substantial volume of air is normally used to transfer the heat, and for economy, it is moved along one, or at the most, a few conduits to and from the heat collector surface and the storage area. The cool air is preferably distributed, through a manifold system, in a generally uniform flow across the large area of the collector, the heated air is collected in a hot air manifold and then transported to the heat storage area or the area of use.

The construction of such large area collectors presents many problems, and, heretofore, it has been quite expensive to provide a collector large enough to satisfy the requirements of the particular building. Furthermore, such units have been generally custom designed and custom built for the particular installation.

According to the present invention, there is provided a modular construction for solar heaters using an air transfer medium which is easily formed into a desired large area collector system by assembling plural modular units. Each modular unit includes a thin wall housing arranged to be secured in side by side and/or end to end relation with adjacent similar housings. The assembled housings are formed with a cooled air manifold at the lower edge and a heated air manifold at the upper edge of the unit. Additionally, gate means are provided for controlling the flow of air through the cooled air manifold to vary the air across the individual heat collectors for producing a uniform flow of air across each of the individual heat collectors.

Included among the objects and advantages of the present invention is to provide a modular solar heat collector unit.

Another object of the invention is to provide a modular solar heat collection unit using air for the transfer medium.

Yet another object of the invention is to provide a modular solar heat collecting unit arranged for connection to adjacent similar units in side by side as well as end to end relation.

Still another object of the invention is to provide a modular solar heat collecting unit arranged for easy and facile connection to adjacent units of similar construction.

A further object of the invention is to provide a modular solar heat collector unit for air heat transfer medium built of sheet metal and arranged for economical construction of a large area solar radiation heat absorption.

A still further object of the invention is to provide a modular solar heat collecting unit arranged for connection to adjacent similar units and joinable together at their cool air manifolding means and, also, at their heated air manifold means.

An additional object of the invention is to provide a modular solar heat collection unit arranged to provide built-in manifolds for cool and heated air and arranged to be connected to similar units having similar such manifold means.

These and other objects and advantages of the invention may be readily ascertained by referring to the following description and appended illustrations, in which.

Figure 1:
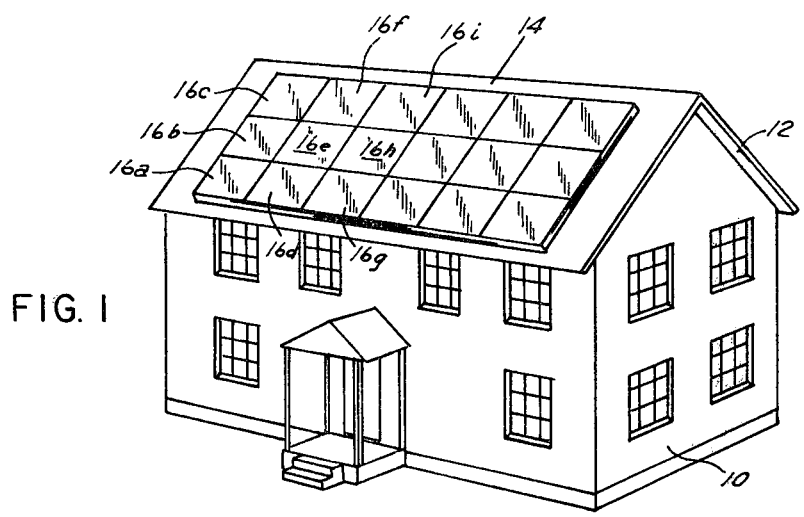
FIG. 1 is a generally schematic, perspective view of a building incorporating solar heating units mounted on the roof thereof.

As illustrated in FIG. 1, an assembled solar radiation absorption unit according to the invention is mounted on a building In this case, a building 10 having a roof 12 is provided with a solar heating arrangement, indicated in general by numeral 14, which is formed of a series of modular units, for example, units 16a, 16b and 16c at the left side of the array and connected together in end to end positioning. This series is mounted adjacent and connected to middle units 16d, 16e and 16f, which are, likewise, connected in end to end position, but are connected at their cool air and heated air ducts, as explained below, to the left series and the right series 16g, 16h and 16i. The individual units are mounted in side by side and/or end to end relation forming the desired area.

Figure 2:
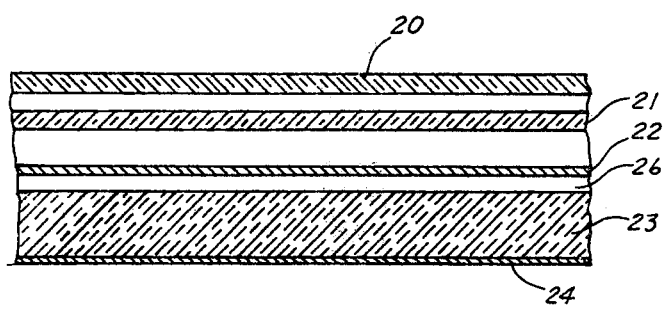
FIG. 2 is an enlarged detail sectional view through a heat absorbing unit, illustrating the arrangement of a transparent covering and insulation member in a sheet metal housing.

In general, as shown in FIG. 2, an individual solar heater includes an outer transparent cover 20, an inner transparent cover 21, a solar radiation absorber 22, and insulation member 23. The housing is provided with a sheet metal bottom 24. The absorption surface 22 may be mounted on the insulation 23 with a space 26 above the absorption surface to provide for the passage of air which picks up heat from the heated absorption surface 22. In other instances, the absorption surface is spaced above the insulation member 23 and the space 26 for the passage of air is, of course, between the absorption surface and the insulation member 23. The absorption surface may be metal or the like, coated with a dull black surface to provide maximum absorption of the solar radiation, and to provide the transfer of the heat from the surface to the underside of the metal where the heat is transferred to air. Also, the absorption surface gives up heat to air passing above and/or below it.

Figure 5:
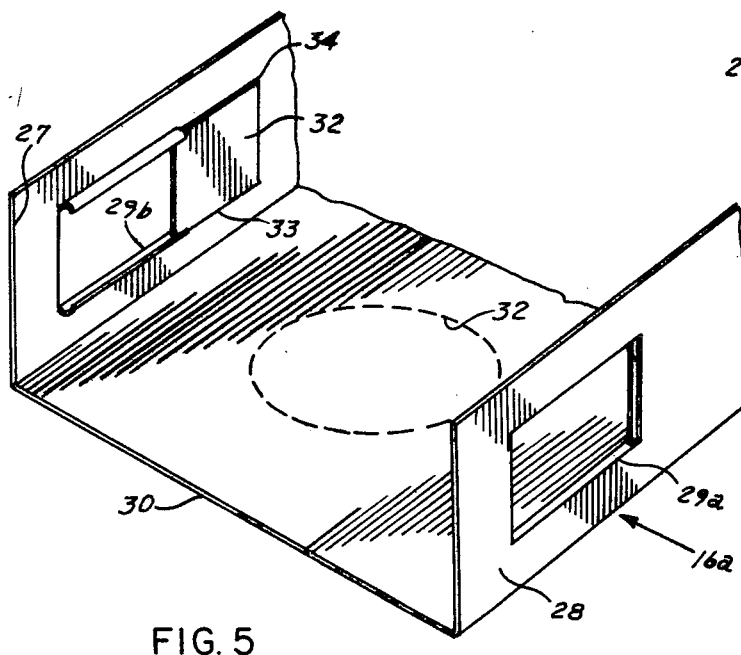
FIG. 5 is an enlarged detail view of the sheet metal housing unit for a solar heat absorber according to the invention.
Figure 6:
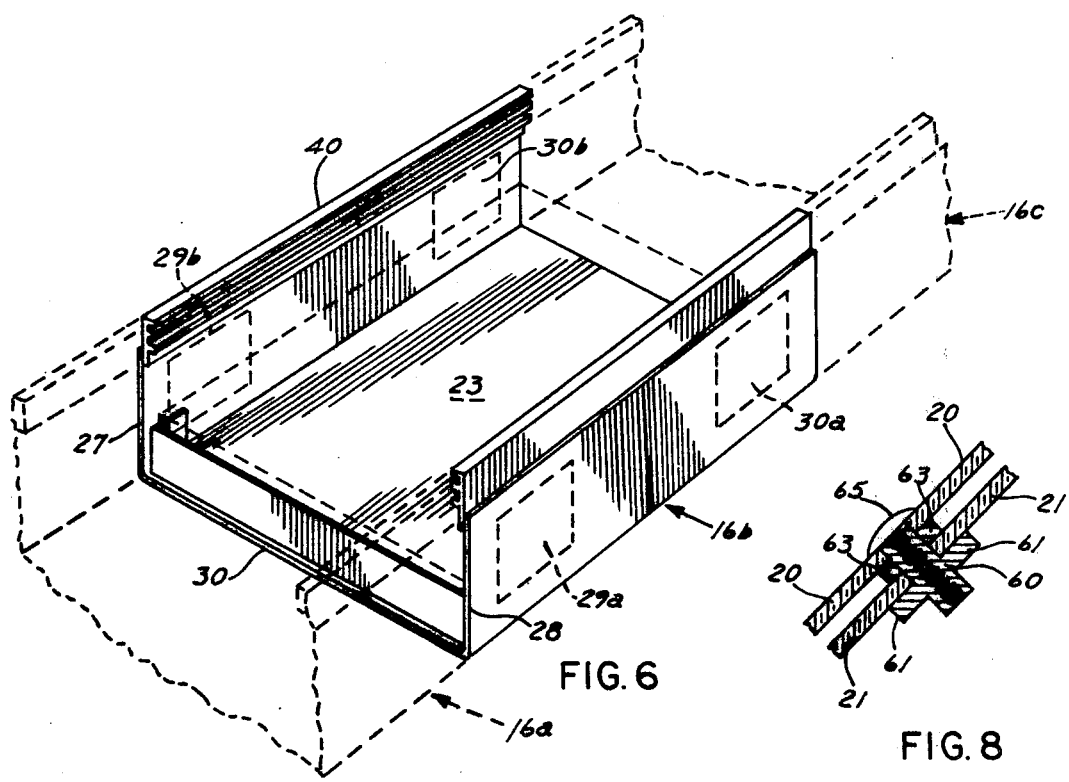
FIG. 6 is a perspective view of one form of the use of the modular housing unit arranged for endwise attachment of adjacent end units.

The basic housing unit is illustrated in FIG. 6, wherein a sheet metal strip is bent to form a U-shaped member having sidewalls 27 and 28 and a bottom wall 30. The sidewalls are provided with means for opposed cutouts 29a and 29b at one end, and opposed cutouts 30a and 30b at the opposite end. These cutouts form openings for the passage of air and which are used for attachment of the housing unit to its adjacent neighbors, when the housings are mounted in side by side relationship. An extrusion 40 may be mounted on the top edge of the sides to hold the glazing or transparent covers for the unit, explained in detail below. When the housing is used as an outside center housing, shown in 16b in FIG. 1, a housing 16a is attached to one end thereof and a housing 16c is attached to the opposite end. When used as a middle housing, as in 16b, the openings or cutouts in the sides are not made or used, since, for example, the air is intended to flow from housing 16a through the housing 16b to the housing 16c which has a manifold for the heated air. When the modular housing is used as the lower end of a series of end to end units, for example, FIG. 5, the housing 16d is provided with a cutout 29a in the wall 28 and a cutout 29b in the wall 27. This permits attachment to other lower end adjacent assemblies. In this position, no cutouts are necessary in the upper end as the unit is mounted end to end with a middle unit. When used as the lower modular unit, the lower open end is closed by a plate or cover of sheet metal, while the upper end remains open and is attached to the next higher unit. In the same manner, the upper unit has its upper end closed by a sheet metal plate or cover and its open end is attached to the upper open end of the middle unit. As shown in FIG. 5, the opening 29b includes a sheet metal cover 32 mounted in tracks 33 and 34 which extend over the opening 29b to provide means for controlling the flow of air from the opening 29a through the opening 29b, for producing a uniform flow of air through all of the units. When the unit 16 is used as the lower left end unit, for example, 16a, the opening 29b is not used and the wall 27 is left solid. When the modular housing unit is used as the upper left end of three units, the wall 27 is, also, left intact but an opening 30a is formed in the upper wall 28 providing a manifold for the heated air. When the unit is used as one of the upper middle units, both the openings 30b and 30a are formed in the side to provide for the heated air manifold. To permit air to enter the unit, an opening 32 may be formed in the bottom of one of the lower units permitting air to enter the one unit, and the wall openings 29 provide for the flow of air through the cool air manifold. By reversing the direction of one of the units on the top, an opening 32 in one of the upper units provides means for an outlet for the heated air from the upper manifold.

Figure 9:
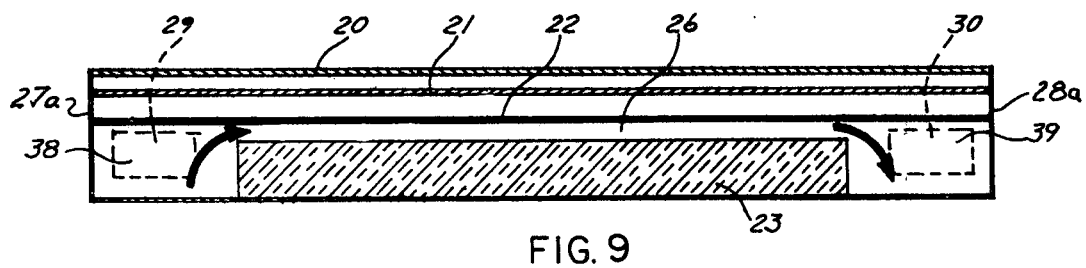
FIG. 9 is a cross-sectional view of the solar radiation absorption unit of the invention, illustrating one form of air flow passages therein.

In FIG. 9, a modular unit is shown diagrammatically in cross section. In this schematic view, the insulation member 23 is shown mounted in the middle of the housing between end walls 27a and 28a to provide an inlet air duct or manifold 38 and an outlet air duct or manifold 39. Also, indicated on the modular housing are the perspective cutouts 29 and 30 in the side walls. These are used, depending on the position of the modular unit in the array. Further, the number of cutouts in each of the two sides of the unit is determined by position of the particular modular unit in the array. Where the unit is used as a lower member providing an inlet manifold at the left end, the insulation and the absorbing surface 22 may be extended to the right end without having an outlet manifold. Where the unit is used in the center between upper and lower units, the insulation and absorbing unit may be extended to both ends, leaving no manifold at either end. Where the modular unit is used as the upper unit in the array, the insulation and the absorbing unit may be extended to the left side of the unit, providing only an outlet air manifold 39.

In a modification, as shown in FIG. 9, the absorption medium 22 may be extended from end to end of the housing, relying on conduction of heat from the surface of the medium to the underside. The fluid passage is, therefore, on the underside of the medium and above the insulation. By making the cutouts smaller, the arrangement may be used in a unit at any position.

Figure 3:
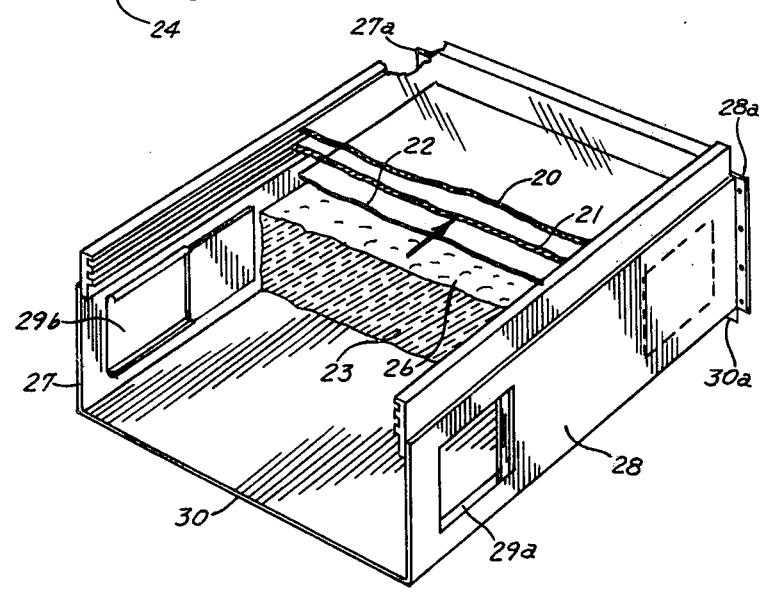
FIG. 3 is a perspective and cutaway view of a modular unit of a solar heat radiation absorption unit according to the invention.

The modular housing shown in FIG. 3 is illustrated with its side wall 28 turned bent back to form a small flange 28a, as well as the bottom forming a flange 30a and the other side 27 forming a flange 27a. The flanges may then be secured to similar flanges on the adjacent member by means of sheet metal screws or the like. When used in the middle section, the unit may be provided with the flanges on both ends for attachment to similar flanges on the lower and upper units or to similar central units. Obviously, other types of connections may be used for joining the sheet metal housings together, for instance, a simple band around the joint of the three walls in end to end members may be used to secure the housings together, as by means of sheet metal screws through the band and into each of the side and bottom walls.

Figure 4:
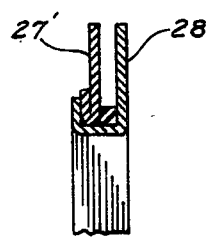
FIG. 4 is an enlarged detail of one method of joining adjacent units of the modular housing construction of the invention.
Figure 4A:
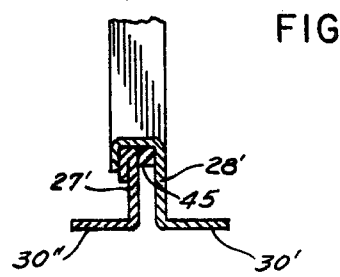
FIG. 4a is a modified connection between adjacent units.

As illustrated in FIG. 4, the units may be provided with attaching means for side by side units, by means of flanges in the openings formed in the side walls. As the side walls are formed of sheet metal, the sheet metal edges may be turned back on themselves in a clamping relation to its adjacent neighbor, if necessary using a small gasket 45 or similar sealing material between the two to aid in forming a tight seal. As shown in FIG. 4, the top of the wall 28' is bent, or crimped, back over the top of the wall 27' which is also bent back upon itself and, being sheet metal, it may be bent easily and with a very simple tool. The side walls of the openings are, also, crimped for the connection. In this manner, two of the housing units may be very easily secured together and in a tight relation. As shown in FIG. 4a, lateral pressure on the units will secure the units together without crimping the flange. The seal 45 seals the units, making the joints gas tight.

In the array of units shown in FIG. 1, the various side by side elements may be secured together by the means shown in FIG. 4 and the end to end elements may be joined together by means of the flanges shown in FIG. 3, or by a band with the sheet metal screws through the band and the side walls. The upper and lower ends are usually closed by sheet metal plates attached by sheet metal screws, or the like, to complete the housing bodies. Where the insulation is not cemented to the bottom of the housing, various types of sheet metal dams may be provided to prevent the movement of the insulation downwardly when the unit is placed at an angle.

Figure 7:
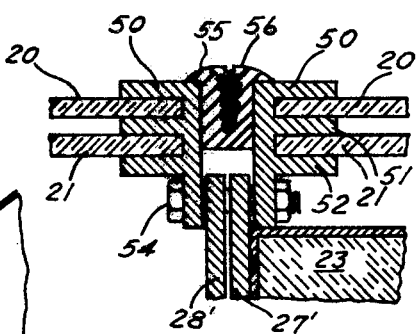
FIG. 7 is an enlarged detail of one form of holder for transparent covering means for solar heaters according to the invention.

The two glazing covers are mounted in any convenient manner on the top of the units to provide a water proof seal. As shown in FIG. 7, one form of doing the same is provided. In this case, an extrusion side member 50, an extrusion in the form of an angle with two central spaced flanges 51 and 52, is arranged to hold the upper glazing 20 and the lower glazing 21. The two extrusions 50 are bolted together by means of a bolt 54 mounted through the adjacent walls 27' and 28'. A weather seal of soft sealing material 55 mounted between the two extrusions 50 and secured in place by means of a screw 56, which expands the material between the two extrusions, provides means for securing the glazing hardware to the sides of the housings, and, also, provides means for securing the housing sides together. This unit may be used for the vertical joining for the vertical joint between the modular housings.

Figure 8:
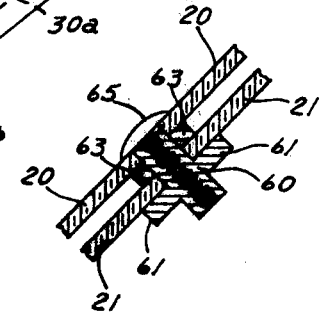
FIG. 8 is a cross-sectional view of a horizontal joint of transparent covering members of solar absorption units.

The horizontal joint is shown in FIG. 8, where an upper extrusion 60 is mounted to hold the glazing 20 and 21 on a flange 61, with the glazing being separated by means of a gasket 63. In a similar manner, the extrusion 60 includes a flange 61 mounted so as to hold the glazing of the lower unit on its flange 61. These glazing members are secured apart by means of gasketing 63. A series of spaced, large headed screws or bolts 65 is arranged to hold the glazing on the two extrusions, holding them in place when tightened into the threaded openings. A bead of sealing material, such as putty or the like, may be provided across the glazing ends to secure the extrusions in a water proof relation with the upper glazing members.

The units are easily made water proof by conventional construction, using gasketing and/or putty. The units may be mounted on the roof directly, or on a framework to provide a desired angle.

The transfer medium, air, is blown over or under or on both sides of the absorption medium, FIG. 9. An array may be made with a single inlet to the cool air manifold from a single duct, and a single outlet from the heated air manifold to a single duct. Also, multiple ducts and multiple inlets and outlets may be used.

The housing permits the easy construction of an array having the desired area of absorbing surface, and of a size to be accommodated by the surface of the roof. Thus, existing structures or new structures may be used to support the array. The modular construction makes fabrication easy and fast, as well as economical. The single housing negates the need for custom designing and fabrication of a solar heat absorber.

What is claimed is:

1. Modular construction for solar heat collectors using air transfer medium and arranged for connection to similar units comprising:
   (a) a generally rectangular modular housing member including thin side walls and a bottom arranged to be connected with removable end walls or end to end with adjacent similar members and having an open top including means for securing cover means thereon, said housing member being arranged with at least one manifold section selected from a cool air integral, internal manifold section across at least one end within said side walls and a heated air integral, internal manifold section across the opposite end and within said side walls, and a heat absorber internal section extending laterally of said at least one manifold section with an air passage permitting exchange of heat to air passing through said heat absorber internal section, said at least one internal manifold section having a cross-sectional dimension greater than said air passage through said heat absorber passage whereby the volume of air through said manifold section is greater than the volume of flow through said absorber internal section,
   (b) means for forming an opening in at least one side wall in said at least one air manifold section arranged to mate with a similar opening in an adjacent member; and
   (c) means for sealing together adjacent units at mated air openings forming an internal manifold for adjacent members.

2. Modular construction for solar heat collectors according to claim 1 wherein said modular housing is formed of sheet metal formed into a general U-shape with upstanding side walls and an integral bottom.

3. Modular construction for solar heat collectors according to claim 1 wherein each modular housing member is joined endwise with an adjacent modular housing member forming an elongated rectangular unit, having an elongated, solar heat absorber internal section included and a solar heat absorber member extending from an internal manifold for cool air at one end to a heated air manifold at the opposite end.

4. Modular construction for solar heat collectors according to claim 3, wherein a plurality of end to end modular housings are arranged side by side and each side by side pair has sealed openings therebetween at the cool air manifold section and at the heated air manifold section, to provide an integral unit having an internal cool air manifold across one end, a plurality of heat absorber internal sections each individually fed a flow air from said internal cool air manifold, and an internal heated air manifold across the end opposite said cool air manifold collecting heated air passing through said heat absorber internal sections.

* * * * *